United States Patent [19]
Smith, Jr.

[11] 3,872,220
[45] Mar. 18, 1975

[54] PROCESS FOR THE PRODUCTION OF LITHIUM CHLORIDE

[75] Inventor: William Novis Smith, Jr., Exton, Pa.

[73] Assignee: Foote Mineral Company, Exton, Pa.

[22] Filed: Jan. 24, 1974

[21] Appl. No.: 436,195

[52] U.S. Cl. .............................. 423/499, 423/197
[51] Int. Cl. ........................................... C01d 11/02
[58] Field of Search ................... 423/499, 197, 179

[56] References Cited
UNITED STATES PATENTS

| | | | |
|---|---|---|---|
| 2,443,168 | 6/1948 | Robson | 423/179 |
| 2,784,057 | 3/1957 | Chisnall | 423/179 |
| 2,968,526 | 1/1961 | Verdieck et al. | 423/499 |
| 3,278,260 | 10/1966 | Hermann | 423/197 |

Primary Examiner—Edward Stern
Attorney, Agent, or Firm—Howson and Howson

[57] ABSTRACT

This invention relates to a process for the production of lithium chloride substantially free of lithium salts of chlorine oxygen acids through substantially quantitative conversion of chlorine in a gas stream to lithium chloride. Chlorine in a gas stream is absorbed in a substantially saturated solution of lithium hydroxide until the lithium hydroxide is converted to a solution of lithium chloride containing lithium salts of chlorine oxygen acids. The latter solution is then treated with ammonia to convert lithium hypochlorite and lithium chlorite present therein to lithium chloride followed by acidification of the solution and treatment with an organic reducing agent to convert lithium chlorate and lithium perchlorate therein to lithium chloride.

12 Claims, No Drawings

PROCESS FOR THE PRODUCTION OF LITHIUM CHLORIDE

BACKGROUND OF THE INVENTION

Lithium metal is produced commercially by the electrolysis of a eutectic mixture of lithium chloride and potassium chloride. The electrolysis procedure produces a gas stream containing relatively dilute concentrations of chlorine together with oxygen, nitrogen, water vapor, minor amounts of hydrochloric acid and carbon dioxide. Economic, esthetic and environmental considerations dictate that the chlorine produced in the electrolysis procedure should be recovered in some manner rather than simply permitted to escape to the atmosphere. In one procedure for the recovery of by-product chlorine, the chlorine containing gas is combined with a solution of sodium carbonate to produce a solution containing a complex formed of sodium salts of chlorine oxygen acids. One of these salts, sodium hypochlorite, is a widely used commodity; however, the expense involved in purifying the solution of the complex to recover sodium hypochlorite is so great that sodium hypochlorite cannot be produced in an economical manner by this approach. Thus, the solution of the complex is treated so that it becomes inoffensive from an esthetic and environmental viewpoint and then disposed. It will be seen that this approach is wasteful, since the lithium metal manufacturer loses the value of the chlorine by-product and incurs the cost of sodium carbonate and the expense of disposal of the solution of the complex.

It is an object of this invention to provide a process for the production of lithium chloride substantially free of lithium salts of chlorine oxygen acids through quantitative conversion of chlorine in a gas stream to lithium chloride.

It is another object of this invention to provide a process for the recovery of chlorine produced as a by-product in the electrolysis of eutectic mixture of lithium chloride and potassium chloride to produce lithium metal in the form of an economically viable product.

Another object of this invention is to provide a process for the recovery of chlorine produced as a by-product in the electrolysis of a eutectic mixture of lithium chloride and potassium chloride in a manner which eliminates the adverse environmental impact occasioned by emitting a chlorine-containing effluent to the atmosphere.

A further object of this invention is to provide a process for the recovery of chlorine produced as a by-product in the electrolysis of a eutectic mixture of lithium chloride and potassium chloride to produce lithium metal in the form of lithium chloride which is substantially free of lithium salts of chlorine oxygen acids.

DETAILED DESCRIPTION OF THE INVENTION

This invention relates to a process for the production of lithium chloride substantially free of lithium salts of chlorine oxygen acids through the substantially quantitative conversion of chlorine in a gas stream to said lithium chloride which comprises (a) absorbing chlorine from a gas stream in a substantially saturated aqueous solution of lithium hydroxide until the lithium hydroxide solution has been substantially completely converted to a solution of lithium chloride and lithium salts of chlorine oxygen acids; (b) adding ammonia to said solution of lithium chloride while maintaining said solution at a temperature of from about 0° to about 100°C. to reduce lithium hypochlorite and lithium chlorite present in said solution to lithium chloride; (c) reducing the pH of said lithium chloride solution to about pH 1.5, and adding an organic reducing agent selected from the group consisting of formaldehyde, oxalic acid and hydroxylamine hydrochloride to said solution while maintaining the temperature thereof at about 80°C. to reduce lithium chlorate and lithium perchlorate present in said solution to lithium chloride; and (d) recovering lithium chloride.

The process for the production of lithium chloride substantially free of lithium salts of chlorine oxygen acids through substantially quantitative conversion of chlorine in a gas stream to said lithium chloride involves three distinct phases. These phases, which are described in detail hereinafter are: (1) absorption of chlorine from a gas stream in a substantially saturated aqueous solution of lithium hydroxide to convert the chlorine to lithium chloride and lithium salts of chlorine oxygen acids; (2) adding ammonia to said solution of lithium chloride produced in step (1) to reduce the lithium hypochlorite and lithium chlorite present in said solution to lithium chloride; and (3) acidifying the solution produced in step (2) and adding an organic reducing agent to the acidified solution to reduce the lithium chlorate and lithium perchlorate therein to lithium chloride.

The chlorine containing gas stream used in the process for the production of lithium chloride may be any gas stream containing relatively dilute concentrations of chlorine and includes chlorine gas streams from any process in which chlorine is produced as a by-product. Chlorine gas streams useful in this process include gas streams produced as a by-product in the electrolysis of an eutectic mixture of lithium chloride and potassium chloride to produce lithium metal. Similarly, a chlorine gas stream is produced as a by-product in the manufacture of sodium metal by an electrolysis procedure. Chlorine gas streams are also produced as a by-product in the manufacture of sodium hypochlorite. The by-product gas streams contain oxygen, nitrogen, carbon dioxide, water vapor, small quantities of hydrochloric acid and minor amounts of other impurities in addition to the relatively dilute concentrations of chlorine. Typical by-product gas streams contain about 0.3 to about 90% chlorine, 2 to 20% oxygen, 8 to 80% nitrogen and about 0 to 0.5% carbon dioxide, said percentages being by weight, based on the weight of said gas.

In addition to providing a process for the production of lithium chloride, the present invention can also be viewed as a means for the recovery and utilization of chlorine from a gas stream and as a valuable process for eliminating the adverse environmental effects occasioned by emitting chlorine containing gas streams to the atmosphere.

The initial step in the present process involves absorbing chlorine from a gas stream such as those described above in a substantially saturated aqueous solution of lithium hydroxide. The lithium hydroxide solution absorbs the chlorine from the gas stream forming a solution of lithium chloride and lithium salts of chlorine oxygen acids. The primary reaction which occurs in the absorption procedure is:

$$Cl_2 + 2\ LiOH \rightarrow LiCl + LiOCl + H_2O \quad \text{I}$$

Secondary reactions, which are particularly dependent on the pH and temperature of the absorption solution, involve the decomposition of lithium hypochlorite produced in I to produce the lithium chlorite and lithium chlorate.

$$3\ LiOCl \rightarrow 2\ LiCl + LiClO_3 \quad \text{II}$$

The lithium chlorate produced in II slowly decomposes to relatively stable lithium perchlorate.

$$4\ LiClO_3 \rightarrow LiCl + 3\ LiClO_4 \quad \text{III}$$

Absorption of chlorine from a gas stream in a substantially saturated aqueous solution of lithium hydroxide thus results in the formation of a solution containing lithium chloride and varying amounts of the lithium salts of chlorine oxygen acids.

The reactions which occur may be summarized as follows:

$$\tfrac{1}{2}Cl_2 + LiOH \rightarrow (v)\ LiCl + (w)\ LiClO + (x)\ LiClO_2 + (y)\ LiClO_3 + (z)\ LiClO_4 \quad \text{IV}$$

Since a goal of this invention is to recover chlorine from a gas stream through conversion of the chlorine to lithium chloride, the process has been designed to favor the formation of lithium chloride rather than lithium salts of chlorine oxygen acids initially and secondly to foster conversion of any lithium salts of chlorine oxygen acids formed in the process to the desired lithium chloride. Pure, relatively concentrated, (27 to 35%, by weight), lithium chloride solutions substantially free of lithium salts of chlorine oxygen acids are produced by the process described herein. The solutions may be dried to an anhydrous state to produce crystals of lithium chloride.

A saturated aqueous solution of lithium hydroxide which may be in the form of a slurry containing a known quantity of lithium hydroxide monohydrate may be used to absorb chlorine from a chlorine gas stream. It has been found that the concentration and purity of the lithium chloride solution produced in the absorption procedure is enhanced if the chlorine is absorbed in an aqueous lithium hydroxide solution which is maintained in a continuously substantially saturated state by recirculating a portion of the absorption solution after passing it through a bed of lithium hydroxide monohydrate particles. Also, it has been found that the absorption procedure produces the highest concentration of lithium chloride if the absorption solution is strongly basic, e.g. has a pH of about 8.5 or above preferably about 10 during the absorption process.

Therefore, in the preferred embodiment of this invention, chlorine from a gas stream is absorbed in an aqueous lithium hydroxide solution maintained in a continuously substantially saturated condition and at a pH of about 8.5 or above by constantly circulating a portion of the absorption solution over a bed of lithium hydroxide monohydrate. The aqueous lithium hydroxide absorption solution has a pH of about 10 to 13 when the chlorine gas stream is first contacted therewith. The chlorine reacts immediately with the lithium hydroxide forming lithium chloride and lithium salts of chlorine oxygen acids. The concentration of lithium chloride and lithium salts of chlorine oxygen acids in solution increases with the conversion of additional chlorine so long as the pH of the absorption solution is maintained strongly basic and is not saturated with lithium chloride and lithium salts of chlorine oxygen acids.

As the concentration of lithium chloride and lithium salts of chlorine oxygen acids in the absorption solution increases, the solubility of lithium hydroxide in the absorption solution decreases. Thus, the absorption solution must be monitored to assure that it remains sufficiently basic for the chlorine conversion. The necessary monitoring can be accomplished through pH measurements; however, the monitoring can best be accomplished with a potentiometer using silver-silver chloride and platinum electrodes to measure the electromotive force (EMF) or oxidation-reduction potential of the absorption solution. The initial EMF of the saturated aqueous solution of lithium hydroxide is about +100 to +200 millivolts (mv). As chlorine is absorbed by the circulating lithium hydroxide solution and the concentration of lithium chloride and lithium salts of chlorine oxygen acids in the solution increases, the EMF slowly decreases to between about −625 mv and −700 mv. The pH of the absorption solution also changes slowly during the absorption from an initial value in excess of about 10 to a value of about 8.5 to about 9 when the EMF reaches about −700 mv.

If chlorine absorption continues once the −700 mv point is reached, there is a rapid decrease in EMF to about −1000 mv. At this point the pH of the absorption solution falls rapidly to the acid side. Chlorine absorption should be stopped before the absorption solution becomes acid because the efficiency of the absorption of chlorine by the absorption solution decreases dramatically at an acid pH.

Therefore, the chlorine absorption phase of the process utilizing a circulating continuously substantially saturated aqueous solution of lithium hydroxide is allowed to continue only until the EMF falls to about −600 to about −700 mv., preferably about −650 to about −675 mv., at which point the solution has a pH of about 8.5 to about 9 and contains about 27 to about 35%, by weight, based on the weight of the solution of "nominal" lithium chloride. The term "nominal" lithium chloride refers to the lithium chloride content of the solution when lithium salts of chlorine oxygen acids have been reduced to lithium chloride by subsequent treatment. The absorption solution actually contains about 15% lithium chloride, about 13 to about 17% lithium hypochlorite, about 0.5 to about 4% lithium chlorate and about 100 to about 300 ppm lithium perchlorate, said percentages being by weight, based on the weight of the solution.

The chlorine absorption procedure is rapid and efficient since about 95 to about 97% of the total lithium hydroxide present in the absorption solution is converted to lithium chloride and lithium salts of chlorine oxygen acids.

It is not necessary that the absorption solution be maintained at any precise temperature during the absorption of chlorine, although it is preferable to avoid high temperatures where practical, since higher temperatures favor the formation of lithium perchlorate, a stable salt which can only be partially reduced to lithium chloride with subsequent treatment. Since the reaction between chlorine and lithium hydroxide is exothermic, the absorption procedure normally proceeds at a temperature of from about 50° to about 100°C. Under such conditions the absorption solution contains from about 0.5 to about 4%, by weight, lithium chlorate. It has been found that the lithium chlorate content of the absorption solution can be lowered to about 0.2%, by weight, if the temperature of the absorption solution is maintained at about 0° to about 5°C. This is not a practical procedure, however, since the same reduction procedures must be followed to convert small amounts of lithium chlorate to lithium chloride as are utilized to convert greater amounts of lithium chlorate to lithium chloride.

The second phase in the process for producing lithium chloride utilizing chlorine gas streams involves treating the absorption solution from step (1) containing lithium chloride and lithium salts of chlorine oxygen acids with ammonia to reduce the lithium hypochlorite and lithium chlorite salts therein to lithium chloride.

The reaction which occurs in the ammonia treatment is:

$$2 NH_3 + 3 LiOCl \rightarrow 3 LiCl + N_2 + 3 H_2O \qquad V$$

The ammonia treatment also reduces most of the lithium chlorite present in the absorption solution; no separate analysis is made for lithium chlorite reduction, however, since the chlorite and hypochlorite salts react comparably, and reduction of lithium hypochlorite means that the lithium chlorite has likewise been reduced.

Commercial anhydrous ammonia is used for the reduction of lithium hypochlorite. This reaction is very exothermic and is accomplished simply by adding ammonia gas to the lithium chloride absorption solution.

Again, the temperature of the ammonia reduction procedure is not critical and can be completed at a temperature of from about 0° to about 100°C. It is preferred to maintain the absorption solution at a temperature of from about 50° to about 80°C. during the ammonia treatment as such temperatures tend to inhibit the formation of lithium chlorate and lithium perchlorate and yet favor the complete reduction of lithium hypochlorite. The rate of addition of ammonia to the absorption solution thus can be as fast as there is cooling available to maintain the temperature of the absorption solution below 100°C. and preferably in the range of about 50° to about 80°C.

The pH of the lithium chloride absorption solution remains relatively constant during the ammonia treatment, that is, the pH of the absorption solution is about 8.5 or above, preferably from about 8.5 to about 10, during the treatment with ammonia.

The EMF of the lithium chloride absorption solution during the ammonia treatment changes from an initial range of from about −600 mv. to about −700 mv. to an endpoint in the range of from about −200 mv. to about −20 mv., preferably about −175 to about −150 mv. Potentiometer readings showing EMF values above about −100 mv. indicate that ammonia in excess of that required to reduce the lithium hypochlorite to lithium chloride has been added to the absorption solution. Any excess ammonia built up in the solution may be neutralized or boiled off.

After treatment with ammonia, the absorption solution contains about 32% nominal lithium chloride, including trace amounts of lithium chlorite and lithium hypochlorite, from about 0.5 to about 4% lithium chlorate and 100 to 300 ppm. lithium perchlorate, said percentages being by weight, based on the weight of the solution.

It has been found that lithium chlorate and lithium perchlorate salts remaining in the lithium chloride solution after ammonia treatment cannot be converted to lithium chloride by any practical procedure so long as the absorption solution has a neutral or basic pH. Therefore, the third phase in the process for producing lithium chloride utilizing chlorine gas streams involves acidifying the ammoniacal absorption solution from step (2) to a pH of about 1.5 or below and adding an organic reducing agent to the acidified solution to reduce the lithium chlorate and lithium perchlorate salts therein to lithium chloride.

Any mineral acid such as hydrochloric acid, sulfuric and or nitric acid may be utilized to acidify the ammoniacal absorption solution, although hydrochloric acid is preferred. The acid is combined with the absorption solution in quantities sufficient to lower the pH of the solution to about 1.5 or below. The solution should then be maintained at a pH of from about 0.8 to about 1.5, preferably from about 0.8 to about 1.2 during the subsequent reduction procedure and this may be accomplished by adding additional small amounts of acid or base such as lithium hydroxide to maintain the pH of the solution in the desired range.

The lithium chlorate and lithium perchlorate salts in the acidified lithium chloride solution are converted to lithium chloride by treatment with an organic reducing agent such as formaldehyde, oxalic acid and hydroxylamine hydrochloride. Formaldehyde, in the form of commercial grade solutions containing about 37%, by weight, formaldehyde, is the preferred reducing agent. The reaction which occurs in the formaldehyde treatment is $$2 H^+ + 2 LiClO_3 + 3 CH_2O \rightarrow$$

$$2 LiCl + 3 CO_2 + 4 H_2O \qquad VI$$

The reduction of lithium chlorate and lithium perchlorate proceeds slowly at ambient temperatures, thus it is preferred to maintain the acidified solution at a temperature of about 80°C. or above, preferably at a temperature of from about 100° to 110°C. during the formaldehyde addition. Preferably, an excess of about 50% of the formaldehyde required for reduction of the lithium chlorate and lithium perchlorate to lithium chloride is used in this procedure.

The most efficient way to determine the amount of formaldehyde required for the reduction process is to monitor the EMF of the solution in the manner described above during the formaldehyde addition. The EMF of the acidified absorption solution prior to the addition of formaldehyde is −700 mv. or lower. The EMF remains approximately constant as the reduction of lithium chlorate and lithium perchlorate with formaldehyde occurs and at the point of almost complete reduction of these salts, the EMF rises rapidly, possibly to as high as −300 mv. The addition of formaldehyde is stopped once the sharp rise in the EMF occurs. While not necessary, a small amount of acid may be added to the solution to cause the EMF to drop to below about −600 mv., after which formaldehyde may again be added until the EMF makes another sharp rise. This technique will insure complete reduction of the lithium chlorate salts.

At the conclusion of the formaldehyde addition, the acid absorption solution is treated with a base such as lithium hydroxide to convert the solution to a neutral pH, thereby terminating the reduction procedure. The absorption solution may also be treated with decolorizing charcoal to remove undesired color impurities in accordance with procedures known in the art. The lithium chloride solution may be used as such, preferably after the removal of some water to insure complete removal of any residual ammonia or formaldehyde. The solution may also be dried to an anhydrous state to recover lithium chloride crystals.

The lithium chloride solution recovered in this process contains about 27% to about 35%, by weight, lithium chloride and is substantially free of lithium salts of chlorine oxygen acids. The anhydrous lithium chloride crystals recovered are likewise substantially free of lithium salts of chlorine oxygen acids and contain substantially undetectable amounts of lithium chlorite or lithium hypochlorite, and trace amounts of lithium chlorate (less than 0.002%), and lithium perchlorate (less than 0.09%), said percentage being by weight, based on the weight of the solid. Pure lithium chloride finds ready use in solution form or as a dry, anhydrous salt in the electrolysis procedure used in the commercial production of lithium metal.

As seen in the foregoing description, the process of this invention provides for the production of lithium chloride substantially free of lithium salts of chlorine oxygen acids through substantially quantitative conversion of chlorine in a gas stream to lithium chloride. This process is particularly desirable when the chlorine gas stream is formed as a by-product in the electrolysis of a eutectic mixture of lithium chloride and potassium chloride to produce lithium metal. In this instance, the present invention makes significant savings possible since the lithium chloride produced can be utilized to produce lithium metal by the electrolysis procedure.

The invention is illustrated in the following example:

EXAMPLE

A series of lithium chloride solutions were prepared in a four-necked, round bottom flask equipped with a stirring motor, thermometer, a gas inlet and apparatus connecting the flask to an Erlemeyer flask to permit circulation of the contents of the round bottom flask to the Erlemeyer flask and back to the round bottom flask. The lithium chloride solutions were prepared by absorbing chlorine gas in a saturated aqueous solution of lithium hydroxide contained in the round bottom flask. Portions of the absorption solution were circulated from the round bottom flask to the Erlemeyer flask which contained a bed of lithium hydroxide monohydrate crystals so as to maintain the solution of lithium hydroxide in a continuously saturated condition for chlorine absorption. The EMF of the absorption solution was continuously monitored with a potentiometer utilizing silver-silver chloride and platinum electrodes and absorption of chlorine gas was terminated when the oxidation - reduction potential of the solution reached −650 to −675 mv. Table I illustrates chlorine gas absorption by continuously substantially saturated lithium hydroxide solutions and sets forth the composition of the lithium chloride solution obtained.

TABLE I

| Sample No. | LiOH | Nominal[a] LiCl Calc. (Wt.%) | Rate $Cl_2$ Addition (g/min) | Absorption Time (hrs) | EMF (mv)[b] Of Solution Start | EMF (mv)[b] Of Solution End | pH Start | Reaction Temp. (°C.) | LiClO[c] (Wt.%) | LiClO$_3$[d] (Wt.%) |
|---|---|---|---|---|---|---|---|---|---|---|
| 1 | Constantly Saturated Solution | 27 | 2–3.8 | 6.5 | +140 | −600 | 10.1 | 55 | 14.6 | 4.6 |
| 2 | do. | 27 | 2–3.8 | 4.5 | +180 | −612 | 9.8 | 90 | — | — |
| 3 | do. | 32.5 | 2–3.8 | 3.5 | +180 | −600 | 10.6 | 55 | 16.7 | 1.8 |
| 4 | do. | 32.5 | 3–5.7 | 3.5 | +200 | −603 | 10.4 | 90 | 13.6 | 2.9 |
| 5 | do. | 24 | 0.7–3.9 | 3 | +140 | −610 | 10.7 | 65 | 13.8 | 0.6 |
| 6 | do. | 32 | 2–3.8 | 4 | +175 | −615 | 9.1 | 68 | 16.7 | 1.5 |

[a]"Nominal" LiCl refers to LiCl content of solution when lithium salts of chlorine oxygen acids have been reduced to LiCl
[b]Silver-Silver Chloride and Platinum Electrodes Used
[c]Also includes some LiClO$_2$
[d]Also includes some LiClO$_4$ After the EMF of the absorption solutions described in Table I reached −600 to −675 mv. and absorption was terminated, ammonia was added to the solutions until the EMF of the solutions reached about −175 to −10 mv., preferably about −175 mv. The solutions were maintained at a temperature of from about 50° to ϕ°C. over a constant temperature bath during the ammonia addition. Table II illustrates the ammonia treatment of the absorption solutions and sets forth the concentrations of the lithium chloride solutions obtained.

TABLE II

AMMONIA REDUCTION OF LiCl-LiClO-LiClO₃ SOLUTIONS

| Sample | Nominal[a] LiCl Calc. (Wt.%) | Initial LiClO[b] (Wt.%) | Initial LiClO₃[c] (Wt.%) | Initial pH | Initial EMF (mv) | Rate Ammonia Addition (g/min) | Time (hrs.) | Temp. (°C.) | Final pH | Final EMF (mv) | Final LiClO₃ (Wt.%) | Final LiClO (Wt.%) |
|---|---|---|---|---|---|---|---|---|---|---|---|---|
| 1 | 27 | 14.6 | 4.6 | 9.8 | −610 | 0.8 | 2 | 50–78 | 9.6 | −15 | 1.4 | Trace |
| 2 | 27 | — | — | 9.8 | −600 | 0.8 | 2 | 68–69 | 9.6 | −40 | 3.6 | Trace |
| 3 | 32.5 | 16.7 | 1.8 | 9.8 | −600 | 0.8 | 2.5 | 55–95 | 9.8 | −20 | 2.3 | Trace |
| 4 | 32.5 | 13.6 | 2.9 | 9.8 | −600 | 1.2 | 2.2 | 75–95 | 9.6 | −60 | 3.9 | Trace |
| 5 | 24 | 13.8 | 0.6 | 10.7 | −610 | 1.2 | 2.2 | 55–102 | — | 110 | 1.2 | Trace |
| 6 | 32.5 | 16.7 | 1.5 | 9.1 | −590 | 1.2 | 3 | 55–77 | 8.9 | −25 | 1.9 | Trace |

[a]"Nominal" LiCl refers to LiCl content of solution when lithium salts of chlorine oxygen acids have been reduced to LiCl
[b]Also includes some LiClO₂
[c]Also includes some LiClO₄

After the addition of ammonia, the solutions illustrated in Table II were cooled to 80°C. and acidified with 22° Be. hydrochloric acid to pH 1.5. 1 g. of a 37% solution of formaldehyde for each 12 g. of solution was added to each solution over about 100 minutes at 100°–110°C. while maintaining the pH of the solutions above 0.8 and below 1.2 with small additions of a 10% solution of lithium hydroxide. The addition of formaldehyde was stopped when the EMF of the solutions rose above about −700 mv. after which the EMF continued to rise to about −500 mv. Sufficient 36% hydrochloric acid was added to drop the EMF of the solution to −600 mv. and formaldehyde addition was continued until the EMF again rose to −500 mv. when formaldehyde addition was again stopped and the solutions were stirred at 100°–110°C. for one hour. A 10% solution of lithium hydroxide was added to the solutions to raise the pH thereof to 7 to 7.5 and 0.5 to 1% of decolorizing charcoal was added after which the solutions were stirred for one-half hour, cooled and filtered. The solutions contained from about 27 to about 33%, by weight, lithium chloride, less than 0.002% LiClO₃ and less than 0.09% LiClO₄. These solutions were dried to form dry, anhydrous white crystals of lithium chloride.

Having thus described the invention, what is claimed is:

1. A process for the production of lithium chloride substantially free of lithium salts of chlorine oxygen acids through substantially quantitative conversion of chlorine in a gas stream to said lithium chloride which comprises:
   a. absorbing chlorine from a gas stream in a substantially saturated aqueous solution of lithium hydroxide until the lithium hydroxide solution has been substantially completely converted to a solution of lithium chloride containing lithium salts of chlorine oxygen acids;
   b. adding ammonia to said solution of lithium chloride while maintaining said solution at a temperature of from about 0° to about 100°C. to reduce lithium hypochlorite and lithium chlorite present in said solution to lithium chloride;
   c. reducing the pH of said lithium chloride solution to about pH 1.5, and adding an organic reducing agent selected from the group consisting of formaldehyde, oxalic acid and hydroxylamine hydrochloride to said solution while maintaining the temperature thereof at about 80°C. to reduce lithium chlorate and lithium perchlorate present in said solution to lithium chloride; and
   d. recovering lithium chloride.

2. The process of claim 1 wherein the chlorine containing gas stream contains from about 0.3 to about 90% chlorine, about 2 to about 20% oxygen, about 8 to about 80% nitrogen, and about 0 to about 0.5% carbon dioxide, said percentages being by weight, based on the weight of said gas.

3. The process of claim 2 wherein the chlorine-containing gas stream is produced as a by-product in the production of lithium metal by the electrolysis of a eutectic mixture of lithium chloride and potassium chloride.

4. The process of claim 1 wherein chlorine is absorbed in said substantially saturated aqueous solution of lithium hydroxide until said solution has a pH of about 8.5 and an EMF of from about −625 mv. to about −700 mv.

5. The process of claim 4 wherein chlorine is absorbed in said saturated aqueous solution of lithium hydroxide until said solution has an EMF of from about −650 mv. to about −675 mv.

6. The process of claim 1 wherein said solution of lithium hydroxide is maintained in a substantially saturated state by recirculating a portion of the absorption solution after passing it through a bed of lithium hydroxide monohydrate particles.

7. The process of claim 1 wherein said saturated aqueous solution of lithium hydroxide is maintained at a temperature of from about 50° to about 100°C. during the absorption of chlorine.

8. The process of claim 1 wherein said solution of lithium chloride has a pH of about 8.5 and is at a temperature of from about 50° to about 80°C. during ammonia addition.

9. The process of claim 1 wherein ammonia is added to said solution until the EMF of said solution is from about −200 mv. to about −20 mv.

10. The process of claim 1 wherein said solution is maintained at a pH of from about 0.8 to about 1.5 and a temperature of from about 100° to about 110°C. during addition of said organic reducing agent and said reducing agent is formaldehyde.

11. The process of claim 1 wherein the lithium chloride solution resulting from addition of said organic reducing agent contains from about 27 to about 35%, by weight, lithium chloride, and is substantially free of lithium salts of chlorine oxygen acids.

12. The process of claim 11 wherein anhydrous lithium chloride crystals substantially free of lithium salts of chlorine oxygen acids are recovered from the lithium chloride solution.

* * * * *